July 10, 1934. P. A. GANDILLON 1,965,801
LIGHTING SYSTEM FOR VEHICLES
Filed Dec. 24, 1932 4 Sheets-Sheet 1
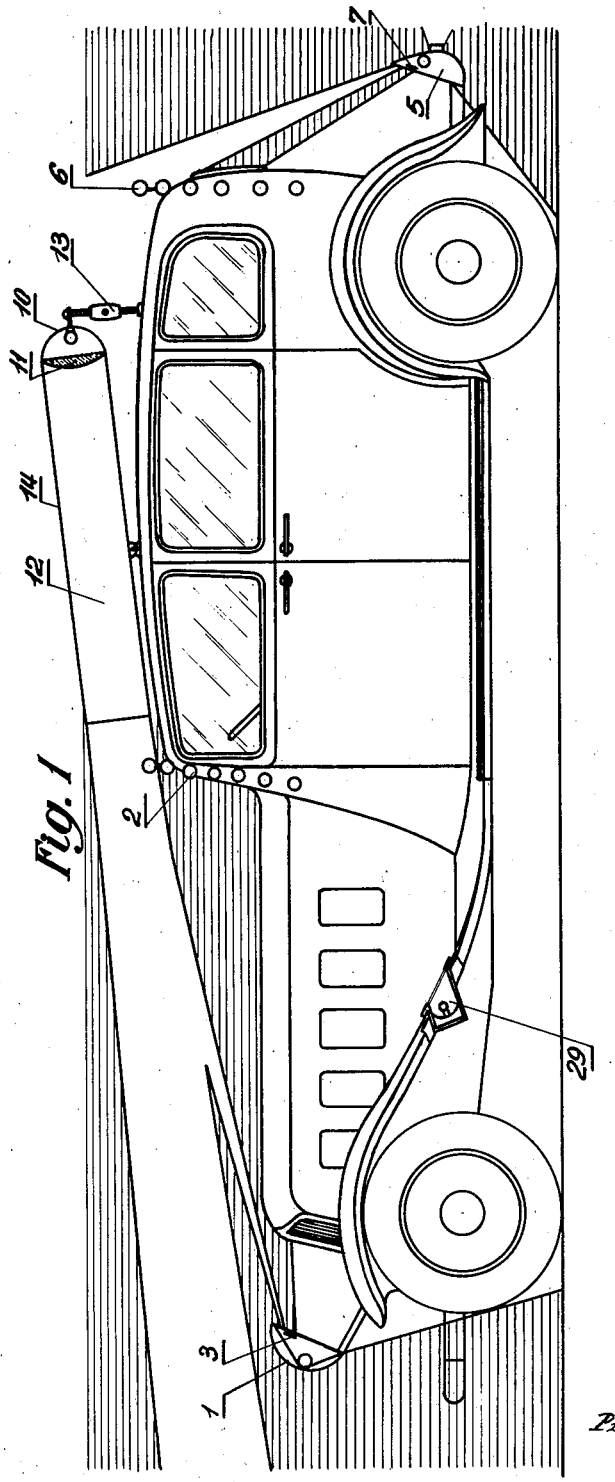
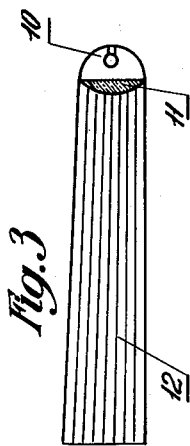
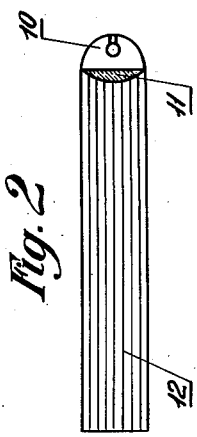
Inventor:
Pierre Albert Gandillon
By
Attorney.

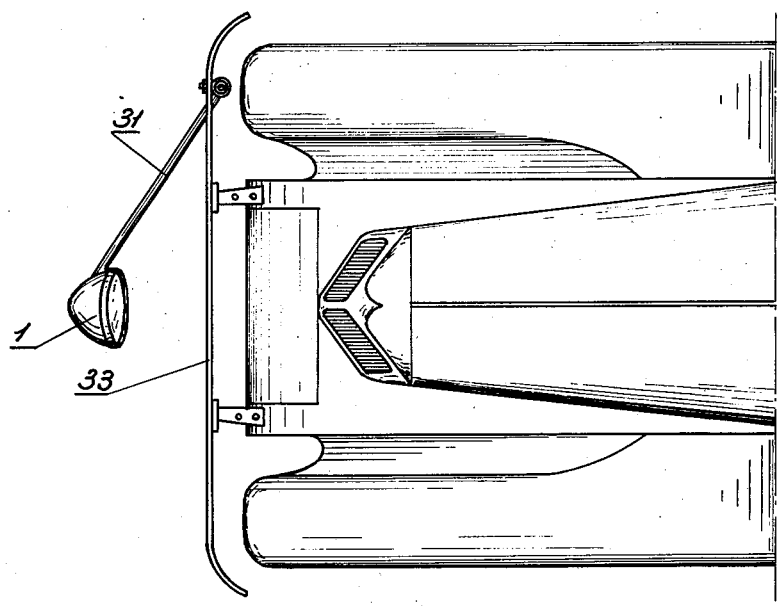
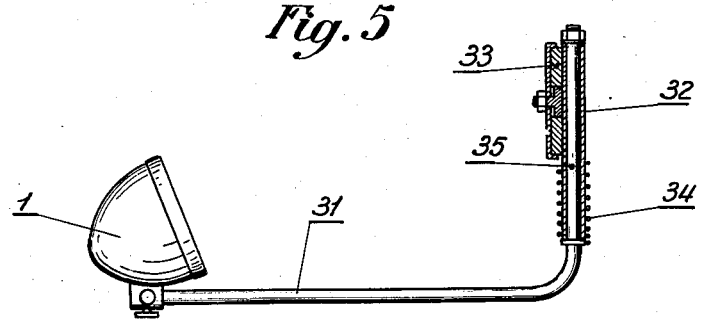

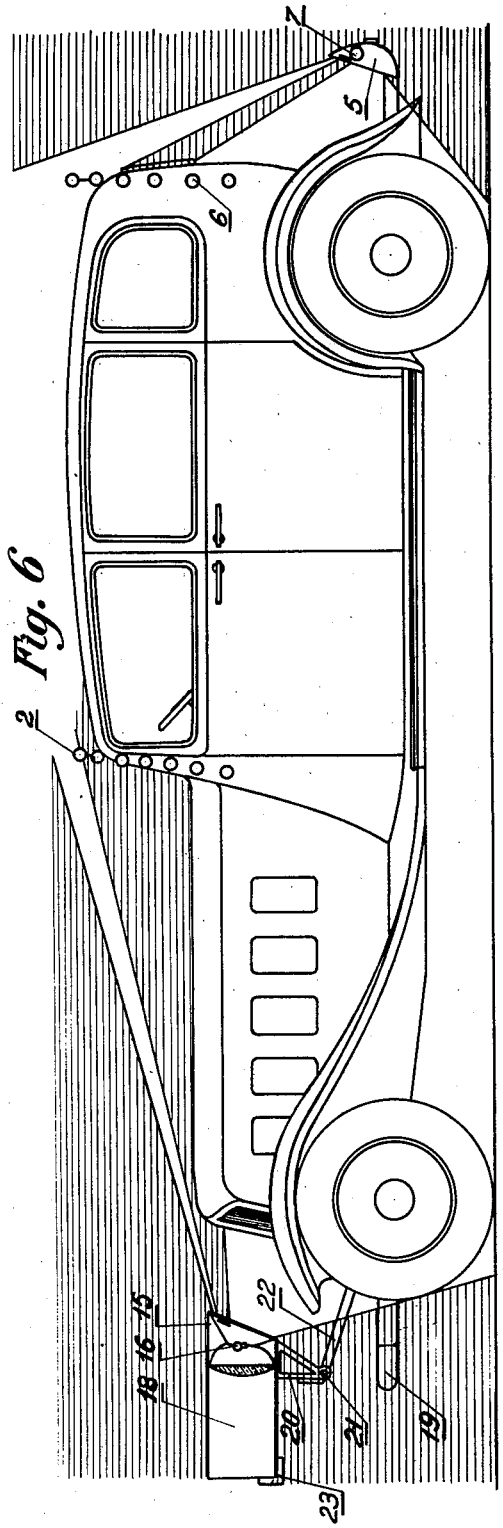
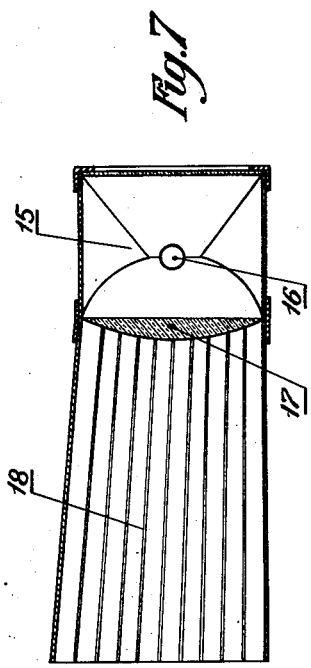

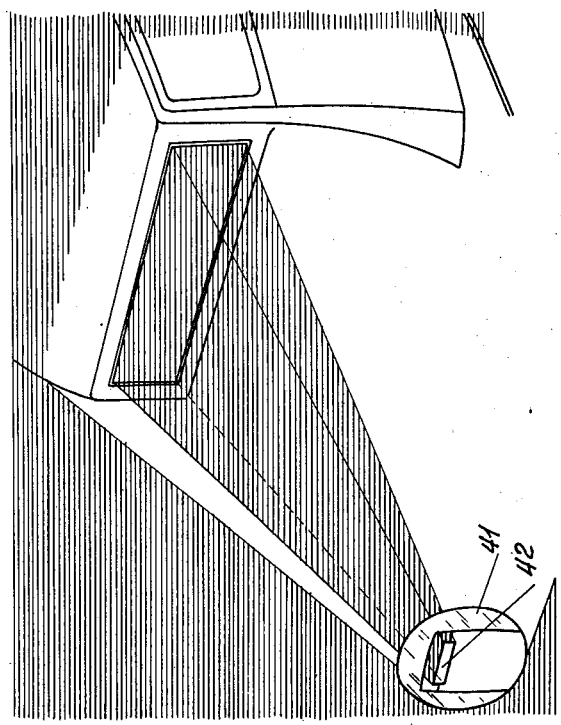
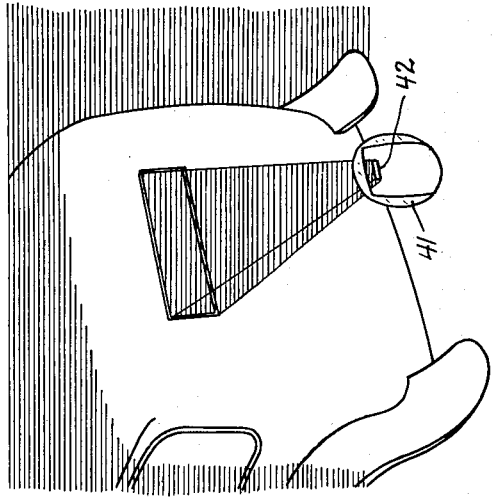
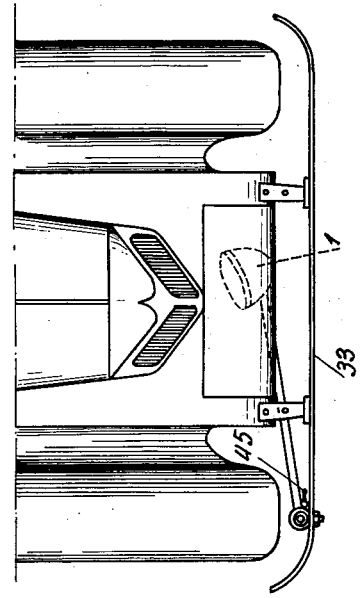
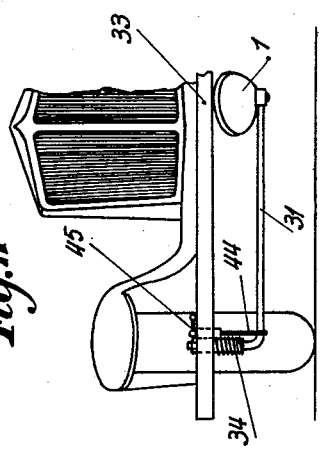
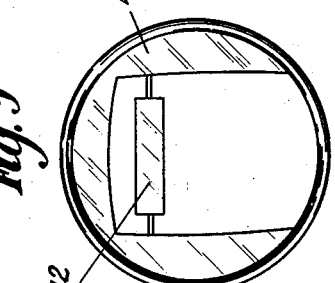
INVENTOR
PIERRE A. GANDILLON
By Emil Bönnelycke
ATTORNEY Patented July 10, 1934

1,965,801

UNITED STATES PATENT OFFICE 1,965,801

LIGHTING SYSTEM FOR VEHICLES

Pierre Albert Gandillon, Paris, France

Application December 24, 1932, Serial No. 648,805
In France October 25, 1932

6 Claims. (Cl. 240—7.1)

The powerful headlights and other projectors with which the modern motor cars are provided, have the great drawback of blinding the persons who are situated in their field of light and at a short distance.

It has been proposed to arrange headlights or like illuminating devices at the exterior of the vehicle, in such manner that the rays of some of them are directed onto the car body whereby it will be well lighted up but as practiced heretofore, such lamps have had the disadvantage of directing rays through windows of the car onto the driver or other occupants, and also to areas outside the car, exposing other road users and pedestrians to glare.

It is an object of the present invention to overcome these disadvantages, and it consists in providing screens placed between the projectors and the vehicle in such position as to intercept all rays from the same directed towards the vehicle windows or beyond the vehicle body.

In the accompanying drawings:

Fig. 1 is an elevational view of a vehicle provided with an arrangement in conformity with the invention.

Fig. 2 is a longitudinal section showing the headlight adapted for lighting towards the front, which is provided with a set of vertical screens.

Fig. 3 shows a modified construction of this headlight.

Figs. 4 and 5 are respectively plan and elevational views, on a larger scale, showing a modified arrangement of the headlight serving to light the front of the vehicle.

Fig. 6 represents a form of construction in which the same headlight serves for the lighting to the front and to the rear.

Fig. 7 is a horizontal section of this headlight.

Fig. 8 is a perspective view of part of the front of an automobile body illuminated by a projector provided with screens.

Fig. 9 is a view on a larger scale of the screen area of the projector.

Fig. 10 is a view similar to Fig. 8 of the rear end of an automobile body.

Fig. 11 is a front elevation corresponding to Fig. 4, but showing the front projector in position retracted towards the car.

Fig. 12 is a top plan view corresponding to Fig. 4 showing the front projector in the same position as in Fig. 11.

The arrangement shown in Fig. 1 comprises a headlight which is mounted at the front of the vehicle and is turned towards the rear, so that it will light the whole front part of the vehicle.

The vehicle body is preferably coated with a paint of a bright colour and a reflecting nature, in order that the vehicle will appear as strongly lighted.

Suitable reflecting bodies, which may consist of glass balls 2, may be mounted on the vehicle in such manner as to mark out the main outline of the car. Such balls may be replaced by prisms or mirrors which reflect back the light which they receive, or by reflecting bands suitably arranged on the car.

It is quite necessary to prevent the rays from the illuminant 1 from blinding the driver or other occupants of the car, and a screen 3 is mounted before the lamp in order that the front window or windshield may be situated in the cone of shadow thus formed. It is preferable to use for the said screen a surface whose shape corresponds to that of the front glass of the vehicle, with reference to the lamp of the headlight 1.

Another screen is used with the headlight 1 in order to intercept the rays which are too divergent and which if allowed to pass beyond the vehicle would inconvenience pedestrians and other road users. In some cases, the screens may consist of certain parts of the vehicle, such as the hood, mud-guards, or the like.

A projector 5 is mounted at the rear, and its light is directed towards the middle part of the vehicle, and it may chiefly light up reflecting bodies 6 mounted on the vehicle body. A screen 7 which is mounted in front of the projector 5, and whose shape corresponds to that of the rear window, prevents the light from this projector from blinding a person looking through the said window.

The arrangement of screens is shown in fuller detail in Figs. 8, 9 and 10. The screen has exterior portions 41 profiled interiorly in such a manner as to coincide with a section of the surface formed by the luminous rays tangential to the body. It also has an interior portion 42, the exterior contour of which corresponds to the surface formed by the light rays which terminate around the periphery of the window of the front windshield to be screened, or in the case of the rear projector shown in Fig. 2, of the rear window of the car. Figs. 8 and 10 clearly illustrate the novel effects produced by the invention, namely, the flood-lighting of large areas of the front, back and sides of the vehicle body, while at the same time selectively screening from glare those openings through which the driver has to make observation. The driver is thus given a clear view through both the front and the rear windows and the side portions 41 of the screens also protect the driver and other occupants of the car from glare when looking through the side windows.

It is further possible to use for this lighting, suitable lamps directed towards the outer surface of the car, and these may be mounted on the mud-guards as shown at 29, Fig. 1, or on the step or at any other suitable place.

It will be noted that by the use of such lamps which are turned towards the vehicle, this latter will be well lighted up, and will appear quite visible to persons travelling on the same road, either in the same or in the opposite direction.

On the other hand, it is necessary to illuminate the region in front of the vehicle, and for this purpose, there is employed, as shown in Fig. 1, a searchlight whose illuminant 10 is situated at the focus of a lens 11, before which is mounted a sleeve or tube 14 having partitions consisting of vertical screens 12, as shown in Fig. 2. Since these screens stop off the light which deviates considerably from the longitudinal axis, this avoids all blinding of persons travelling on the road in the contrary direction to the vehicle and keeping to the right of the road, according to the rules.

For the lighting of the sides of the road, such screens may be arranged for a slight divergence to the right, as shown in Fig. 3, the left-hand screen being always parallel with the longitudinal axis of the vehicle.

In order to vary the inclination of the device consisting of the searchlight and the screens 12, a regulating device is employed which consists for example of a nut 13 engaging two screws having contrary threads.

The light source 10, instead of having the form of a point, may follow a horizontal straight line, in which case the lens 11 will be cylindrical and the tube 14 flattened horizontally.

The lighting system might even be mounted between the roof of the vehicle and a supplementary roof situated somewhat above.

The headlight 1 which lights the front of the car need not be mounted at the rear of the bumper but may be arranged as shown in Figs. 4 and 5. In this case, the headlight 1 is mounted on an elbow 31, whose vertical arm may turn in a tube 32 secured to the bumper 33 and is urged by a spring 34 into the operative position shown in Fig. 4. A stud 35 limits the movement of the arm 31 in the tube 32.

Due to this arrangement, should the headlight 1 meet with an obstacle, the arm 31 will turn to the rear, and the headlight will be brought under the bumper.

A locking device, for example, a sliding bolt 44 with handle 45 (see Figs. 11 and 12) is preferably provided on the bumper, in order to hold the headlight in its rear position when out of use.

A single headlight 15 may be used to replace the two headlights 1 and 10 shown in Fig. 1, and an arrangement of this kind is shown in Figs. 6 and 7. The single lamp 16 of this headlight sends its light to the front and rear and is located at the common focus of two annular reflectors 16a and 16b facing front and rear, respectively. The rays sent to the front are brought into a parallel beam by a lens 17, in front of which are mounted screens 18 which are parallel or diverge slightly to the right, as shown in Fig. 7.

To prevent the screens 18 located in front of the bumper 19 from all damage from shocks, the device consisting of the headlight and screens is mounted on a bracket 20 pivoting, on a horizontal axle 21, upon a support 22, and a spring (not shown) urges the headlight into the operative position. A shock-absorbing buffer 23 is mounted at the front of the screens 18, and should this buffer meet with an obstacle, the headlight and screen device 18 will pivot backward about the axle 21.

Whatever be the form of construction employed, the invention constitutes the proper solution of the problem of vehicle lighting, since the vehicle is now made clearly visible for outside persons, and on the other hand, the headlights will have no blinding effect either on the occupants of the car or persons on the road or at the side of the same in the vicinity of the car.

It is obvious that the invention is not limited to the forms of construction shown in the drawings, and these are susceptible of all suitable modifications in detail without departing from the principle of the invention.

The system covered by the said invention, is applicable not only to motor vehicles, but also to vessels and to aircraft, and the word "vehicle" as employed in the claims is defined as including land, air and water vehicles.

I claim:

1. Vehicle lighting system comprising projectors directing their light rays towards the vehicle body to flood-light large areas of said body, said projectors being provided with screens extending transversely to said rays and of such contour and position as to intercept all rays directed to the windows of the vehicle and beyond the vehicle body.

2. Vehicle lighting system according to claim 1 in which a projector is pivoted about a vertical axis on the vehicle body and is urged by a spring into its position of use.

3. Vehicle lighting system comprising a flood-light projector, a mount securing the projector to the vehicle body with its light rays directed towards said body, and in a position extending beyond the protection afforded by the body, screens extending transversely to said rays and of such contour and position as to intercept all rays directed to the windows of the vehicle and beyond the vehicle body, a pivoted connection between the projector mount and the vehicle body permitting the projector to be moved within the protection afforded by said body, and means for securing the projector mount in both positions.

4. Vehicle lighting system comprising projectors directing their light rays towards both the front and the rear of the vehicle body to flood-light large areas of the front, back and sides of said body, said projectors being provided with screens extending transversely to said rays and of such contours and positions as to intercept all rays directed to the windows of the vehicle and beyond the vehicle body.

5. Vehicle lighting system comprising a projector mounted towards the front of the vehicle body to flood-light large areas of the front and sides of said body, said projector being provided with screens extending transversely to the said rays and of such contours and positions as to intercept all rays directed towards the windows of the vehicle and beyond the vehicle body, said projector comprising a single lamp arranged to emit light rays towards both the front and the rear and located at the common focus of two correspondingly facing annular reflectors.

6. Vehicle lighting system according to claim 1, in which a projector is mounted on an arm urged by a spring to its position of use and is pivotally mounted on a bumper attached to the vehicle, and in which a locking member is mounted on said bumper adapted to retain the projector rearwardly of the bumper.

PIERRE ALBERT GANDILLON.